United States Patent
Hrle et al.

(10) Patent No.: US 10,275,507 B2
(45) Date of Patent: Apr. 30, 2019

(54) REPLICATION OF A RELATIONAL DATABASE

(71) Applicant: International Business Machines Corporation, Armonk, NY (US)

(72) Inventors: Namik Hrle, Boeblingen (DE); Daniel Martin, Stuttgart (DE); Jens P. Mueller, Stuttgart (DE); Knut Stolze, Jena (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 941 days.

(21) Appl. No.: 14/665,565

(22) Filed: Mar. 23, 2015

(65) Prior Publication Data
US 2015/0278329 A1 Oct. 1, 2015

(30) Foreign Application Priority Data
Mar. 26, 2014 (GB) .................................. 1405398.7

(51) Int. Cl.
*G06F 17/30* (2006.01)
(52) U.S. Cl.
CPC .............................. *G06F 17/30575* (2013.01)
(58) Field of Classification Search
CPC .................................................. G06F 17/30575
See application file for complete search history.

(56) References Cited

U.S. PATENT DOCUMENTS

| 7,587,435 | B2 | 9/2009 | Shepherd | |
|---|---|---|---|---|
| 7,809,691 | B1 * | 10/2010 | Karmarkar | G06F 11/1448 707/674 |
| 7,885,922 | B2 * | 2/2011 | Pareek | G06F 11/1466 707/610 |

(Continued)

FOREIGN PATENT DOCUMENTS

JP 2006293910 A 10/2006

OTHER PUBLICATIONS

Jagadish, et al.: "Asynchronous Version Advancement in a Distributed Three Version Database"; , AT&T Laboraties; 1998, pp. 9.

(Continued)

*Primary Examiner* — Ashish Thomas
*Assistant Examiner* — Jedidiah P Ferrer
(74) *Attorney, Agent, or Firm* — Cantor Colburn LLP; Anthony Curro

(57) ABSTRACT

Embodiments are provided for replicating a relational source database associated with a transaction log of the relational source database. In operation, embodiments may perform receiving a request for replicating data of the relational source database to a relational target database and identifying a first start position within the transaction log. Upon having identified the first start position, embodiments may further perform waiting at least a time period for ensuring that each transaction currently executing on the relational source database at a moment of receiving said request has terminated at an end of said time period. After having waited said time period, embodiments may perform an asynchronously creating of a copy of data of the relational source database to produce a created copy. In turn, embodiments may perform writing the created copy to the relational target database and identifying a repair start position within the transaction log.

9 Claims, 4 Drawing Sheets

(56) References Cited

U.S. PATENT DOCUMENTS

| | | | |
|---|---|---|---|
| 7,974,943 B2* | 7/2011 | Gilbert | G06F 17/30575 |
| | | | 707/610 |
| 8,121,978 B2 | 2/2012 | Wiss et al. | |
| 8,639,677 B2 | 1/2014 | Pruet, III | |
| 8,645,323 B2 | 2/2014 | Jackiewicz et al. | |
| 9,760,597 B2* | 9/2017 | Jimenez Peris ... | G06F 17/30377 |
| 2004/0133591 A1* | 7/2004 | Holenstein | G06F 17/30578 |
| | | | 707/999.102 |
| 2005/0193024 A1* | 9/2005 | Beyer | G06F 17/30286 |
| | | | 707/E17.005 |
| 2009/0043772 A1* | 2/2009 | Rajakumar | G06F 17/30362 |
| | | | 707/E17.007 |
| 2011/0231447 A1 | 9/2011 | Starkey | |
| 2012/0150802 A1* | 6/2012 | Popov | G06F 17/30575 |
| | | | 707/635 |
| 2012/0158684 A1* | 6/2012 | Lowenstein | G06F 17/30171 |
| | | | 707/704 |
| 2014/0006458 A1* | 1/2014 | Hsieh | G06F 17/30292 |
| | | | 707/803 |

OTHER PUBLICATIONS

Kemper, et al.: "Hyper: A Hybrid OLTP&OLAP Main Memory Database System Based on Virtual Memory Snapshots"; Tech. Univ. Munchen, Data Engineering (ICDE), 2011 IEEE 27th International Conference 2011; pp. 1 (Abstract Only), Apr. 11-16, 2001.
Maintaining Object Consistency in a Triplestore Database; retieved from the Internet http://ip.com/IPCOM/000212704 on Mar. 23, 2015; Publication Date Nov. 23, 2011; http://ip.com/IPCOM/000212704 (Abstract Only).
Seach Report No. GB1405398.7 dated Oct. 8, 2014; pp. 3.

* cited by examiner

REPLICATION OF A RELATIONAL DATABASE

BACKGROUND

The present disclosure relates to the field of relational databases and more particular to data replication.

Replication is a mechanism to copy data between multiple database systems. A variety of replication products exists to cope with the plurality of data replication techniques available and the plurality of requirements of different enterprises. Currently, there exist tools for regularly executing a full-backup and/or for executing incremental backups, such as by means of snapshot technologies. Data replication may be executed for backup purposes and for storing data redundantly on multiple machines in a cloud environment to provide said data to a plurality of clients more quickly (increased processing power by storing the same data on multiple machines redundantly) and/or more reliably (in case one database server fails, another one may take over immediately).

In any case, replication should enable that a copy of the source data represents a consistent state of the source database. In turn, replication should ensure that no data written to the source data during the copying process is lost and that the copy can be synchronized later, e.g., by incremental backups, with the source data.

To ensure consistency between the source data and the copy of the data generated by replication, current replication tools perform disruptive operations to ensure consistency of the source data at the moment when replication starts. The current replication tools try to achieve a point in time where there are no open transactions on the source data by creating a read lock on the complete source data at the moment when the replication process starts. The read lock prohibits performing any write transactions on the source data until the replication process has finished. In the meantime, all transactions to perform a write on the source data are queued. Said queuing is disadvantageous as high latency times for individual write operations on the source data may be caused. Thus, current data replication approaches often result in a significant performance reduction of the source database during an ongoing replication process.

SUMMARY

According to an aspect of the present disclosure, there is provided a computer-implemented method (a system and/or a computer program product) for replicating a relational source database. The computer-implemented method comprises associating the relational source database with a transaction log, the transaction log comprising a list of all transactions previously or currently being performed on the relational source database in chronological order, and receiving a request for replicating data of the relational source database to a relational target database. Then, in response to receiving the request for replicating data of the relational source database, computer-implemented method comprises identifying a first start position within the transaction log, the first start position being indicative of a most recent log position in said transaction log. Upon having identified the first start position, computer-implemented method further comprises waiting at least a time period for ensuring that each transaction currently executing on the relational source database at a moment of receiving said request for replicating data of the relational source database has terminated at an end of said time period. After having waited said time period, computer-implemented method comprises asynchronously creating a copy of data of the relational source database to produce a created copy by selectively reading at least one of unmodified data and data having been stored to the relational source database by committed transactions, wherein the selectively reading excludes any changes to be imposed on or having already been imposed on data values by transactions that are not committed at a moment when said one or more data values are read for creating the copy. In turn, computer-implemented method comprises writing the created copy to the relational target database and, in response to completing the writing of the created copy to the relational target database, identifying a repair start position within the transaction log, the repair start position representing a moment of starting a repair operation. The repair operation comprises identifying within the transaction log a first set of transactions comprising all transactions that started after the first start position and that committed before the repair start position, and traversing the transaction log to execute on the created copy written in the relational target database the first set of transactions.

According to an aspect of the present disclosure, there is provided a computer-implemented method (a system and/or a computer program product) for replicating a relational source database, the relational source database being associated with a transaction log of the relational source database, the transaction log comprising a list of all transactions previously or currently being performed on the relational source database in chronological order. The computer-implemented method comprises receiving a request for replicating data of the relational source database to a relational target database. In response to receiving the request for replicating data of the relational source database, computer-implemented method further comprises identifying a first start position within the transaction log, the first start position being indicative of the most recent log position in said transaction log. The computer-implemented method comprises immediately after the receiving of the request, asynchronously creating a copy of data of the relational source database by selectively reading unmodified data or data having been stored to the relational source database by committed transactions, wherein the selectively reading excludes any changes to be imposed on or having already been imposed on data values of the relational source database by transactions which are not committed at a moment when said one or more data values are read for creating the copy. Then, computer-implemented method comprises writing the created copy to the relational target database; after completion of the writing of the created copy to the relational target database, identifying a repair start position within the transaction log, the repair start position representing a moment of starting a repair operation; and starting the repair operation.

BRIEF DESCRIPTION OF THE DRAWINGS

The above and other items, features and advantages of embodiments of the invention will be better understood by reading the following more particular description in conjunction with the figures wherein.

DETAILED DESCRIPTION

Figure 1:
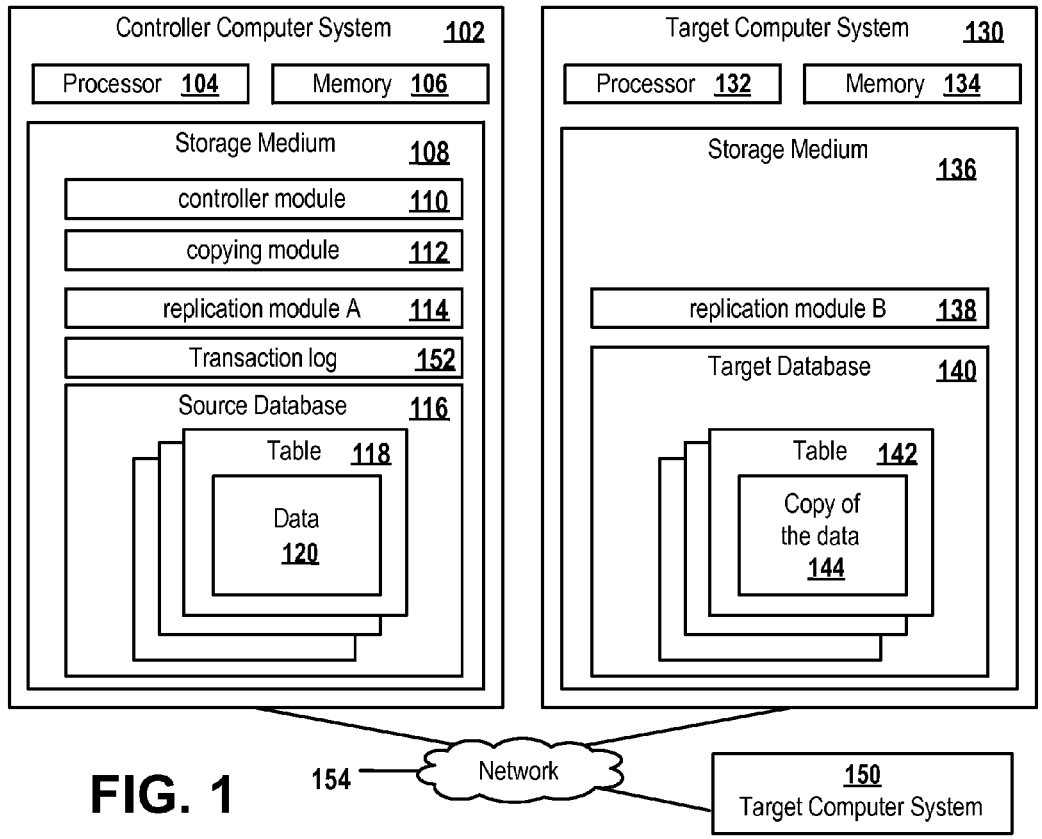
FIG. 1 is a block diagram of a distributed computer system in accordance with an embodiment.

Embodiments may be implemented as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments of the invention may take the form of a computer program product embodied in one or more computer readable medium(s) having computer readable program code embodied thereon. Any combination of one or more computer readable medium(s) may be utilized. The computer readable medium may be a computer readable storage medium or a computer readable signal medium. A computer readable storage medium may be, for example, but not limited to, an electronic, magnetic, optical, electromagnetic, infrared, or semiconductor system, apparatus, or device, or any suitable combination of the foregoing. As will be appreciated by one skilled in the art, the features of the embodiments can be combined with each other. For example, a service container may comprise a process rewriting module and a mapping processor module according to embodiments of the invention, whereby both modules are respectively implemented as individually installable plug-ins of the service container.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

A computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the embodiments of the invention may be written in any combination of one or more programming languages, including an object oriented programming language such as Java, Smalltalk, C++ or the like and conventional procedural programming languages, such as the "C" programming language or similar programming languages. It will be understood that the block of the diagrams depicting application programs or modules can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in said blocks of the diagrams. The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in said blocks.

As will be appreciated by one skilled in the art, the features of the embodiments can be combined with each other. For example, a service container may comprise a process rewriting module and a mapping processor module according to embodiments, whereby both modules are respectively implemented as individually installable plug-ins of the service container.

FIG. 1 depicts a distributed computer system comprising a controller computer system 102 having a controller module 110 and one or more target computer systems 130, 150. The computer systems are connected to each other via a network 154, e.g., the Internet or an intranet. The storage medium 108 of the control computer system may host a source database 116 and further modules, e.g., the controller module 110, a copying module 112, and a source-side replication module 114. It is likewise possible that the source database 116 is hosted by a separate server connected to the control computer system 102 and each of the target computer systems 130, 150 over the network. The computer system 102 comprises memory 106 and one or more processors 104 for executing the modules 110-114. The number and individual function of each of said modules may differ for different embodiments. The interoperation of said modules is described for some embodiments in greater detail in the description of FIG. 5.

The source database 116 comprises multiple database tables 118. The tables 118 comprise some data 120 that shall be replicated (i.e., copied) to a target database 140 of the target computer system 130. The data 120 may consist of the complete source database or of a subset of the tables of said database or on a subset of data within one or more tables. Note that there may exist one or more target computer systems 150 respectively comprising a target database operable to receive and store a copy 144 of the data 120. Each of the target computer systems 150 may comprise a storage medium 136, memory 134 and a processor 132 for running a respective instance of the target database 140 and for running a target-side replication module 138.

In view of FIGS. 2, 3, and 4, embodiments of three (3) alternative data replication methods will be described in greater detail. The methods may be executed, for example, by three (3) alternative implementation variants of the controller module 110 or by a single type of controller module operable to work in three alternative modes. An advantage of to all three methods includes allowing the execution of all kinds of transactions (executing a read and/or write access) on the tables 118 of the source database 116 while reading the data 120 for creating the copy 144 in parallel. Thus, the data 120 can be replicated to one or more target databases 140 without reducing the performance and usability of the source database.

According to an embodiment, each record of the data 120 of the source database has assigned a unique key, which is also written to the transaction log whenever a transaction reads or writes data of said data record. Said unique keys may be enforced by database constraints. Using said unique keys in the source database and the transaction log may be advantageous as this allows identifying and mapping transactions in the transaction log and respective records having been written to the target database quickly. Thus, in case some changes having been imposed by some transactions on the source database were missed by the copying process, said changes can be applied in a kind of "repair process" or "repair operation" in the target database by means of said unique record identifiers.

According to some embodiments, the copying module 112 is a utility provided e.g., by the 'database management system' (DBMS) of the source database and the controller module is operable to interoperate with the copying module for interactively creating the copy (that may be inconsistent right after its creation) and storing in the target database. In other embodiments, the copying module is part of the controller module. The copying module is operable to asynchronously create a potentially inconsistent copy from the data of the source database. In DB2 for z/OS, this copying module is called 'UNLOAD online utility'. The potentially inconsistent (and quickly generated) copy can be obtained by running the copy utility with the change option (e.g., SHRLEVEL CHANGE ISOLATION CS). The skip option (e.g., SKIP LOCKED DATA option, which queries records from a table that are not locked in any other active session of the database) may not be used for creating the copy.

It is possible that the target computer systems are client computer systems receiving an updated copy of the source database on a regular basis.

Figure 2:
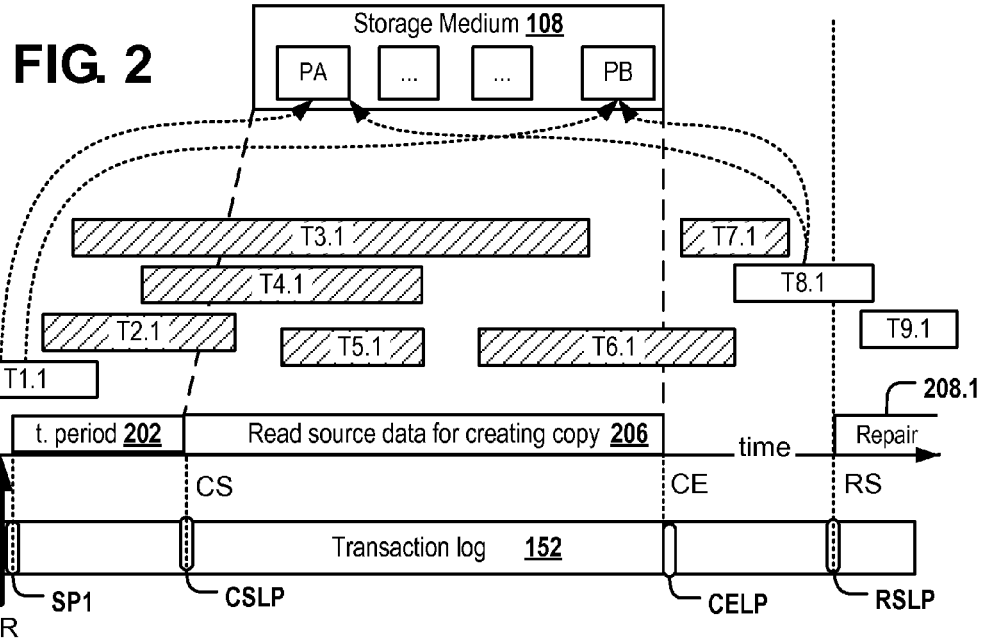
FIG. 2 depicts aspects of a first alternative for replicating data in accordance with an embodiment.
Figure 6:
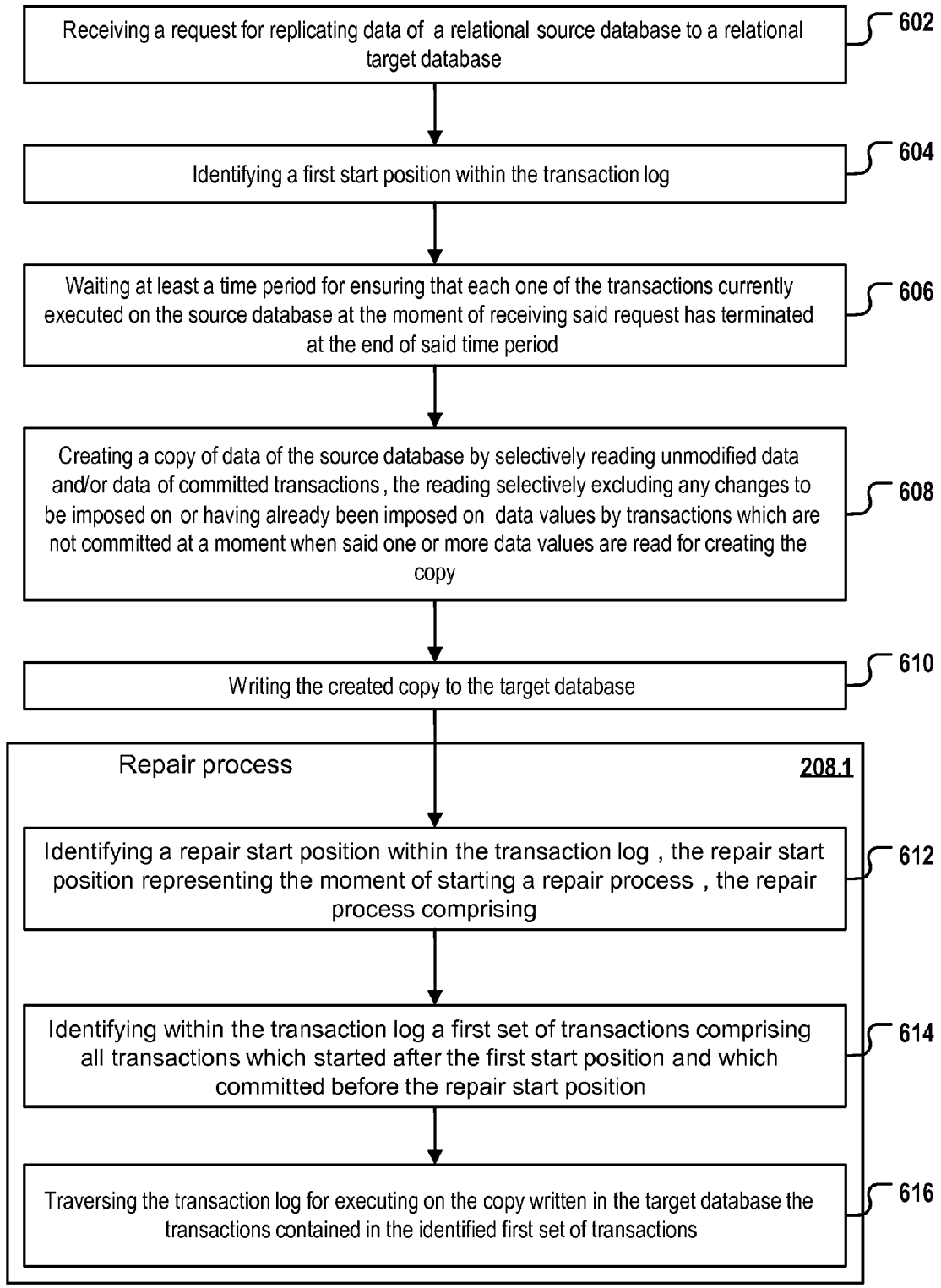
FIG. 6 depicts a flowchart of the first alternative in accordance with an embodiment.

FIG. 2 depicts some aspects of an embodiment based on a first alternative computer-implemented method for replicating a relational source database 116. Said first alternative method is also depicted in FIG. 6 in the form of a flowchart. FIG. 2 and FIG. 6 will be described together.

The source database is associated with a transaction log 152 of the source database. Said transaction log comprises a list of all transactions previously and/or currently being performed on the source database in chronological order. The first alternative computer implemented method comprises receiving 602 a request for replicating data of the source database 116 to a relational target database 140, where a moment TRR of receiving the request is depicted by means of an arrow in FIG. 2.

In response to receiving the request, the first alternative computer implemented method also comprises identifying 604 a first start position SP1 within the transaction log, the first start position being indicative of a most recent log position in said transaction log at the moment TRR of receiving the request. A recent log position may then be determined, for example, by determining the head-of-log (i.e., a log position a new log-entry that would have been generated at that moment would have been written into).

Upon having identified the first start position, the first alternative computer implemented method further comprises waiting 606 at least a time period 202 to ensure that each one of the transactions currently executed on the source database at the moment TRR of receiving said request has terminated at the end of said time period. For example, a transaction T1.1 is currently running at the moment TRR but has terminated (aborted unsuccessfully or has committed) at the end of the time period 202. After having waited said time period, asynchronously creating 608 a copy 144 of data 120 of the source database by selectively reading unmodified data and/or data having been stored to the source database by committed transactions. The reading selectively excluding any changes to be imposed on or having already been imposed on data values of the source database by transactions, which are not committed at a moment when said one or more data values are read for creating the copy. The moment of starting replication is indicated in FIG. 2 as CS—'copying start'.

Next, the first alternative computer implemented method comprises writing 610 the created copy to the target database; after completion of the writing, identifying 612 a repair start position RSLP within the transaction log, the repair start position representing the moment RS of starting a repair process 208.1; and starting the repair operation.

The repair operation comprises identifying 614 within the transaction log a first set of transactions T2.1, T3.1, T4.1, T5.1, T6.1, T7.1 comprising all transactions which started after the first start position SP1 and which committed before the repair start position RSLP; and traversing 616 the transaction log for executing on the copy written in the target database the transactions contained in the identified first set of transactions.

As specified above, the copying is executed asynchronously and the reading selectively excludes any changes to be imposed on or having already been imposed on data values of the source database by transactions which are not committed at a moment when said one or more data values are read for creating the copy. For example, any currently executed transaction, such as T5.1, may set a lock on any row affected by said transaction, and the reading of said rows for creating the copy is halted until said transaction commits. Depending on the used database system, the locks may also be generated on a per-value basis.

Said features are advantageous as they allow creating the copy 144 without reducing the performance of the source database. During the whole process of reading the data for creating the copy, which is depicted in FIG. 2 by the bar 206 delimited by CS and CE (copying ended), read and write actions may be performed on the source database without queuing said transactions until the respectively affected rows have been read. This results in a copy that may contain or may not contain changes imposed by some transactions, e.g., T5.1 or T6.1 depending on whether the reading of the data values of parameters PA, PB of FIG. 2 was executed after or before said transactions T5.1 or T6.1 committed.

Thus, the copy having been written to the target database right after completion CE of the reading process may be inconsistent. However, thanks to the above described identification of the first set of transaction in the transaction log and the execution of said transactions on the (potentially inconsistent) copy in the target database during repair 208, it is ensured that any changes imposed by the identified first set of transactions which might have been lost in the copying process 206 are also imposed on the copy 144, thereby bringing the copy in consistence to the source data 120 at moment that copying ends. Operations, e.g., individual Structured Query Language (SQL) statements whose changes may or may not be contained in the created copy and which may have to be 'repaired' after creation of the copy are indicated in FIGS. 2-4 by hatching. Thus, the identification of the first set of transactions and their execution may be considered as a kind of "repair" of the quickly generated, potentially inconsistent copy. Said "repair" may start at any time after the copy was written to the target database. A recent log position RSLP (repair start log position) is determined in the transaction log at a moment RS of FIG. 2 of starting the "repair". The CSLP (copying start log position) and the RSLP define a range in the transaction log where changes may have been missed. The determination of said log positions allows to determine how far asynchronous replication needs to reach back in the transaction log to apply the missed changes in the repair process and how long the "repair process" must be executed to ensure that the copy 144 has become consistent with the data 120. After having reached that point of consistency, i.e., after having completed the repair process 208, it is possible to regularly create incremental backups. Said incremental backups may be executed asynchronously as described above, or synchronously. The beginning of executing the repair process or operation is indicated in FIGS. 2-4 by log position RSLP. However, the kind and number of transactions or individual data value changes to be executed on the copy in repair mode differ in FIGS. 2-4.

Figure 3:
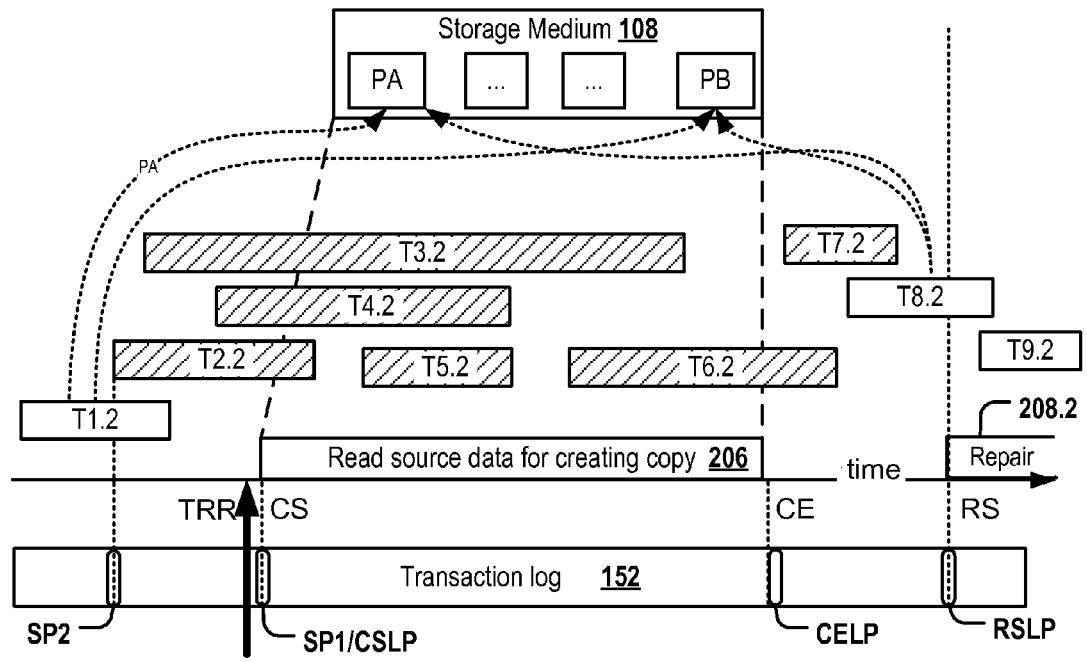
FIG. 3 depicts aspects of a second alternative for replicating data in accordance with an embodiment.
Figure 4:
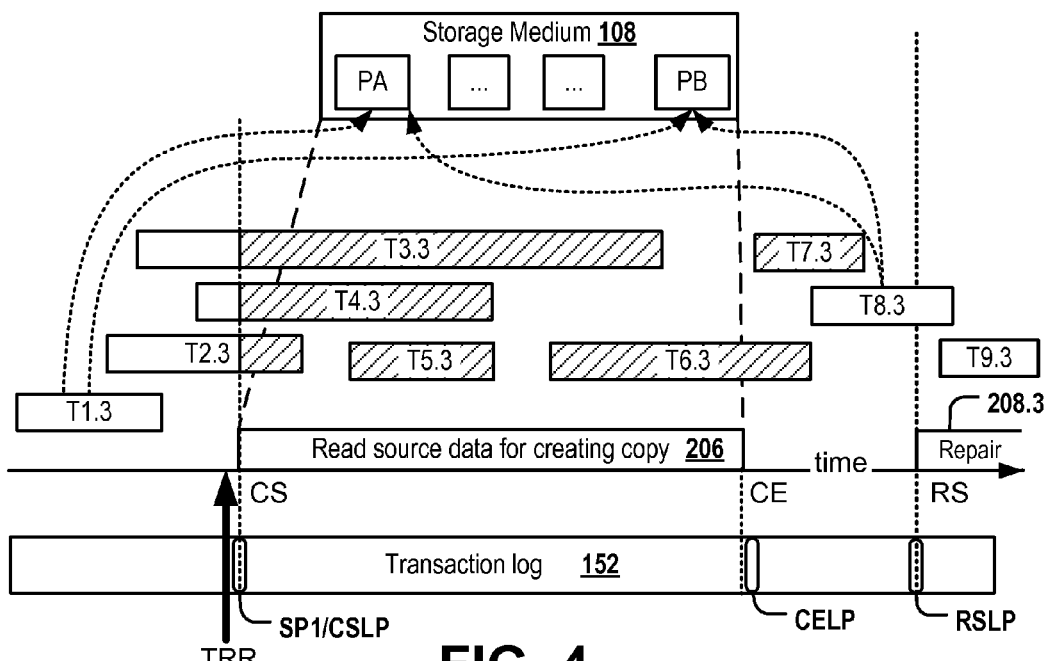
FIG. 4 depicts aspects of a third alternative for replicating data in accordance with an embodiment.

It is assumed, for illustrative purposes, that each of the transactions T1-T9 depicted in FIGS. 2-4 performs a read and/or write access on the storage elements comprising parameters PA and PB of FIGS. 2-4 and optionally also further storage elements comprising further parameters. For clarity reasons, the dotted lines indicating said read and/or write access are depicted only for T1 and T7 of FIGS. 2-4.

Four different scenarios in respect to changing the parameter values of the parameters PA, PB will be described in the following. In each scenario, a transaction sets parameter PA currently having parameter value A to parameter value A' and sets parameter PB currently having parameter value B to parameter value B'. PA is set at time point W1 to A' and PB is set at time point W2 to B'. W2 lies after W1. In addition, the copying process 206 accesses the storage elements comprising parameter PA for reading the respective parameter value at time point R1 and accesses the storage elements comprising parameter PB for reading the respective parameter value at time point R2. R2 lies after R1.

Scenario a): W1 is before R1 and the transaction committed before R1. The copying process 206 will read data values A' and B'.

Scenario b): R1→R2→W1→W2; Both W1 and W2 lie after R2. The copying process 206 has read parameter values A and B and missed the changes applied in W1 and W2. Said changes have to be applied on the copy in repair process 208.

Scenario c): W1→R1→W2→R2; W1 is before R1 and W2 is after R2. This scenario is rendered impossible: as soon as an operation of the transaction starts to modify PA, the row comprising PA is locked and the new parameter value A' of PA cannot be accessed by the copying process 206. Rather, the copying process 206 halts until said particular transaction has committed. Depending on the used source database system, said lock may not be set in a row-wise manner, but in a per-data-value basis. As described above, the reading selectively excludes any changes to be imposed on or having already been imposed on data values of the source database by transactions which are not committed at a moment when said one or more data values are read for creating the copy. Thus, the copying process halts until said transaction has also set PB to B' and has committed. Then, the copying process resumes. Due to the locking, scenario c) results in scenario a) where at first PA and PB were modified in W1 and W2 by the transaction, and after commit of said transaction, the reading is executed at R1 and R2.

Scenario d): R1→W1→W2→R2. The transaction starts, then the copying process reads value A at R1, then the transaction sets PA to A' at W1, then it sets PB to B' at W2 and the transaction commits. Then, the copying process reads B' from PB at R2. In this scenario, the copying process missed the change of PA; the created copy is inconsistent with the original data. However, said missed change of PA from value A to A' is propagated to the target database in the repair process 208.

In the following, some log positions, some transactions and their interdependence will be explained: the transaction log position SP1 reflects the beginning of capturing changes in the data 120 to be replicated. It is the most recent log position having been determined in response to receiving a replication request. The moment of receiving said request is indicated by arrow TRR. Log position CSLP corresponds to the time moment CS when the reading of the data for creating the copy starts and log position CELP of FIGS. 2-4 corresponds to a time moment CE when the reading of the data for creating the copy ends.

T1.1: all changes imposed by transaction T1.1 will be contained in the created copy from the beginning, because T1.1 committed within the waiting time period 202 and thus before the copying process 206 started. It is not necessary to repeat said transactions in repair process 208.1 (e.g., a repair operation).

T2.1, T3.1, T4.1: said transactions started after SP1 and commit before the start RS of the repair process; changes imposed by that transactions may or may not be picked up by the copying process 206 depending if the changes that are already written to pages of the storage medium 116 that have already been read by process 206 or not. Missing changes of said transactions will be identified and applied during the repair process 208.1, which is illustrated in FIG. 6, blocks 612-616. During said repair process, changes will be added to the copy, and will not be applied a second time if they are already contained in the created copy at the end CE of the copying process 206.

T5.1, T6.1, T7.1 also start after the begin CS of the copying process 206 and commit before the start RS of the repair process. As explained for T2.1, T3.1 and T4.1, changes imposed by T5.1 may or may not have been picked up by the copying process 206. Therefore, it has to be checked during the repair process 208.1 if any changes were missed and missing changes have to be applied, in accordance with the transaction log, to the copy in the target database.

T8.1 starts after the end CE of the copying process 206 and commits after the start RS of the repair process 208.1. Any changes imposed by T8.1 will not have been picked up by the copying process 206, because T8.1 has not committed before the start RS of the repair process. Said transaction may be propagated after completion of the repair process, e.g., when executing an incremental backup. Not including T8 in the repair phase prohibits changing the copy in accordance with a transaction which might have failed to commit.

T9.1 starts after the repair process 208 was started. Like for T8.1, the changes imposed by T9.1 may be replicated to the target database later on after completion of the repair process, e.g., by means of an incremental backup. Said incremental backup may be executed according to the above-described asynchronous replication method, or by a synchronous replication method.

Thus, for the example depicted in FIG. 2, the identified set of first transactions which have to be checked and eventually be repaired in the repair process 208.1, comprises T2.1-T7.1, but not T1.1, T8.1 and T9.1.

According to some embodiments of said first alternative computer-implemented method, said method comprises identifying the time period by analyzing the transaction log. The method comprises identifying a previously executed transaction having the maximum execution time of all previously executed transactions listed in the transaction log. Then, said identified maximum execution time or an even longer time period is used as the waiting time period 202. This may be advantageous as it allows a reliable estimation of the minimum waiting time 202 necessary to ensure that all transactions currently being executed at SP1 have terminated when the reading process 206 starts. Said analysis may be performed automatically.

Alternatively, a moment in time of having identified the first start position is used as a first time point; all transactions currently executed at the first time point are identified; identifying, as a second time point, a moment in time when the one of said currently executed transactions having the longest execution time commits; and using the time interval between said first and second time points as the time interval. Said features may be advantageous as they allow the automated determination of a waiting time that is also applicable without creating an inconsistent copy in a scenario where one of the currently executed transactions at SP1 has a longer remaining runtime than the maximum execution time of all previously executed transactions listed in the transaction log.

According to some embodiments which use said maximum execution time determined by analyzing the log as the time period 202, the data replication method comprises: determining, that at least one transaction having been currently executed in the moment of identifying the first start position has not committed at the end of the time period; and outputting a warning message and/or automatically re-executing all operations of the first alternative of the data replication method which follow the receiving of the request, thereby using a current time as the time of receiving the request. Said features may be advantageous as they may prohibit an unnoticed creation of an inconsistent copy of the data in the target database.

FIG. 3 depicts some aspects of an embodiment based on a second alternative computer-implemented method for replicating a relational source database 116. The source database is associated with a transaction log 152 of the source database. Said transaction log comprises a list of all transactions previously and/or currently being performed on the source database in chronological order. The second alternative computer implemented method may, for example, also be executed by the controller module. Said method comprises receiving a request for replicating data 120 of the source database to a relational target database 114. Then, in response to receiving the request, the method further comprises identifying a first start position SP1 within the transaction log, the first start position being indicative of the most recent log position in said transaction log. Immediately after the receiving of the request asynchronously, the method comprises creating a copy of data of the source database by selectively reading unmodified data and/or data having been stored to the source database by committed transactions. The reading selectively excludes any changes to be imposed on or having already been imposed on data values of the source database by transactions which are not committed at a moment when said one or more data values are read for creating the copy. Thus, contrary to the first alternative, the herein described second alternative starts the copying of the data immediately. The first start position SP1 is identical to the log position CSLP indicating the beginning of the copying process 206.

Next the method comprises writing the created copy to the target database; after completion of the writing, identifying 612 a repair start position RSLP within the transaction log, the repair start position representing the moment RS of starting a repair process 208.2; and starting the repair operation.

The repair operation comprises identifying in the transaction log a current set of transactions, the current set of transaction consisting of all transactions having been currently executed at the moment of identifying the first start position; in the depicted example of FIG. 3, said current set of transactions would comprise transactions T2.2, T3.2 and T4.2 as said three transactions had been currently executed at SP1; identifying the earliest starting one T2.2 of said current set of transactions; identifying a second start position SP2 in the transaction log, the second start position being a position whose log entry was created at the moment of starting said identified earliest starting transaction T2.2; identifying within the transaction log a first set of transactions comprising all transactions which started at or after the second start position and which committed before the repair start position RSLP; in the depicted example, said first set of transactions would comprise T2.2, T3.2, T4.2, T5.2, T6.2, T7.2, but not T1.2 and also not T8.2 or T9.2; and traversing the transaction log for executing on the copy written in the target database the transactions contained in the identified first set of transactions.

The second alternative of the replication method being exemplified by FIG. 3 may be advantageous as it allows to immediately start data replication upon receiving said request. It is not necessary to determine the time period 202 and to wait said time period before replication can start.

As explained already for the first alternative exemplified by FIG. 2, the transactions of the identified first set of transactions may comprise changes which may have been missed by the copying process. Said changes are applied to the copy 144 in the target database, if necessary, in a repair process 208.2 analogously to the first alternative: executing the repair process 208.2 may comprise the identification of the first set of transactions in the log, the traversing of the log and the executing said identified first set of transactions on the copy in the target database.

FIG. 4 depicts some aspects of an embodiment based on a third alternative computer-implemented method for replicating a relational source database 116. The source database is associated with a transaction log 152 of the source database. Said transaction log comprises a list of all transactions previously and/or currently being performed on the source database in chronological order. The third alternative computer implemented method may, for example, also be executed by the controller module. Said method comprises receiving a request for replicating data of the source database to a relational target database. Then, in response to receiving the request, the method comprises identifying a first start position within the transaction log, the first start position SP1 being indicative of the most recent log position in said transaction log. Immediately after the receiving of the request asynchronously, the method further comprises creating a copy 144 of data of the source database by selectively reading unmodified data and/or data having been stored to the source database by committed transactions, the reading selectively excluding any changes to be imposed on or having already been imposed on data values of the source database by transactions, which are not committed at a moment when said one or more data values are read for creating the copy.

Next, the method comprises writing the created copy to the target database; and after completion of the writing, identifying 612 a repair start position RSLP within the transaction log, the repair start position representing the moment RS of starting a repair process 208.3 (e.g., repair operation).

The repair operation comprises identifying in the transaction log a current set T2.3, T3.3, T4.3 of transactions, the current set of transaction consisting of all transactions having been currently executed at the moment of identifying the first start position; identifying a first and a second set of operations; the first set of operations (indicated by absence of hatching in T2.3, T3.3 and T3.4) consists of all operations of all transactions in said current set T2.3, T3.3, T4.3 of transactions which have been performed on the source database before the moment CS of starting the reading of the data; the second set of operations consist of all operations (indicated by the hatching) of transactions in said current set of transactions having been performed on the source database at or after the moment CS of starting the reading of the data; identifying within the transaction log a first set T5.3, T6.3, T7.3 of transactions comprising all transactions which started at or after the first start position and which committed before the repair start position RSLP; and traversing the transaction log for selectively executing on the copy written in the target database all operations of the transactions contained in the first set of transactions and all operations of the second set of operations, thereby excluding all operations of the first set of operations (having been performed on the source data before CS).

Said features may be advantageous as they may allow to further speed up the process of 'repairing' the created copy, i.e., the process of traversing the log for identifying and applying all changes of the source data that were missed when creating the copy 144 also on the copy in the target database. All three alternative replication methods may rely on a log comprising value changes imposed by a particular operation, e.g., an SQL statement. The first and second alternatives evaluate all operations of each transaction in the identified set of first transactions individually. To the contrary, the third alternative does not check whether the changes imposed by operations indicated by a white background (i.e., the absence of a hatching) of transactions T2.3, T3.3 and T4.3 have already been contained in the copy at moment CE. All operations written to the log before log position CSLP are known/assumed to be already contained in the copy 144 and are therefore not checked or executed in the repair process.

Additional remarks in respect to embodiments of the three alternative data replication methods depicted in FIG. 2-4 will now follow.

The request may be sent, for example, by a client device, by a backup manager, a snapshot module, a load balancer used for evenly distributing the processing load among a plurality of redundant database servers, a data management module of a cloud computing environment or the like. Each transaction may consist of one or more operations whose imposed changes on the source database have respectively being logged. According to embodiments of the first, second and third alternative data replication methods, the executing of the identified first set of transactions and/or the executing of the second set of operations comprises: checking, for each of the operations of said transactions and/or for each operation of said second set of operations, if changes to be imposed on one or more data values by said operation had already been performed on said data values in the source database before the copy was created; and selectively executing said operation only in case said changes had not been performed already.

According to further embodiments of the first and second alternative data replication methods, the transaction log comprises, for any UPDATE, INSERT and DELETE operation, one or more original data values to be overwritten by said operations, and one or more respective new data values to overwrite the original data values. The checking comprises comparing the original data values and/or the new data values with corresponding data values of the copy in the target database for determining if a respective operation had already been performed in the source database before data values affected by said transaction were read for creating the copy. Note that the transaction log also comprises unique identifiers for each data record modified by a particular operation. This may be advantageous as said features allow applying any changes having been missed during the copy on the target database in an efficient manner. Further, executing the repair process comprises replacing the original transactions in the identified first set of transactions by one or more modified transactions which in addition may comprise a checking if a particular change is already contained in the copy generated by the copying process 206. For example as shown in TABLE 1—SQL Statement Translation, the following original SQL statements executed on the source database may be replaced in repair process 208 by other SQL statements comprising a checking which are performed on the target database.

TABLE 1

SQL Statement Translation

| Original SQL/Pseudo-SQL statements executed on the source database | Replacement SQL/Pseudo-SQL statements executed on the target database during repair process 208 |
|---|---|
| INSERT into table X (record-ID, A, B) values (Y, VA, VB); | If row exists in table X where record-ID = Y, UPDATE table X SET A=VA, B=VB where row-ID=Y; If row does not exists in table X where record-ID = Y, INSERT into table X (record-ID, A, B) values (Y, VA, VB); |
| UPDATE table X SET A=VA', B=VB' where row-ID=Y; | If row does not exist in table X where record-ID = Y, INSERT into table X (record-ID, A, B) values (Y, VA, VB); If an outdated row does exist in table X where record-ID = Y, UPDATE table X SET A=VA', B=VB' where row-ID=Y; If an up-to-date row does exist in table X where record-ID = Y, DO NOTHING; |

TABLE 1-continued

SQL Statement Translation

| Original SQL/Pseudo-SQL statements executed on the source database | Replacement SQL/Pseudo-SQL statements executed on the target database during repair process 208 |
| --- | --- |
| DELETE from table X where row-ID=Y; | If row does exist in table X where record-ID = Y, DELETE from table X where row-ID=Y;<br>If row does not exist in table X where record-ID = Y, DO NOTHING; |

Thus, executing the repair processes 208.1, 208.2 and 208.3 of any one of the three alternatives may comprise executing the replacement operations, e.g., in the form of replacement SQL commands, comprising additional checks on the target database (see right column of the table) instead of the original operations (see original SQL statements in the left column).

According to embodiments of any of said three alternatives, the source database is configured such that the only kind of locks imposed by the reading of the data on concurrently executed transactions of the source database are locks on individual data values being currently read for creating the copy, whereby all other data values contained in the same row as said currently read data value allow read operations, e.g., 'SELECT' statements, and write operations, e.g., 'UPDATE, INSERT, DELETE' operations, by said concurrent transactions. Thus, the three alternative methods may further comprise performing one or more database transactions on the source database in parallel to the reading of the data for generating the copy. This may be advantageous as said kinds of locks usually have almost no negative impact on the performance of the source database.

According to embodiments of any one of the three alternative methods, the transaction log comprises checkpoints. A checkpoint is a point automatically and regularly specified and written into the transaction log (a log position, to the contrary, does not necessarily comprise a log entry). An SQL based database engine is able to use a checkpoint as a start for applying changes contained in the transaction log during recovery after an unexpected shutdown or crash. Determining the first start position comprises using the most recent checkpoint in said transaction log at the moment of starting creating the copy as the first starting position SP1. This may be advantageous as the checkpoints are written into the log anyway. This eases the control of the method by an operator who may compare the beginning and end of the replication process with the checkpoints in the log.

According to further embodiments, the various embodiments of any one of the three alternative replication methods may be performed by a controller module 110. The reading of the data by the controller module for creating the copy may comprise: the controller module sending a first command to a copying module 112 for initiating the reading of the data; in response to said first command, the copying module configures the source database; for example, the source database may be a DB2 database and the configuring may comprise setting said DB2 database to a state (e.g., SHRLEVEL CHANGE CONSISTEND state, which copies primary database backups); the copying module reads the data from the source database and forwards the read data to the controller module; the controller module creates the copy of the data from the forwarded data. Thus, the controller module may interact with the copying module for replicating the data. According to some embodiments, the source database and the controller module are operated on a first processing device 102 and the target database is operated on a second processing device 130. The first and second processing devices are connected to each other via a network 154.

Figure 5:
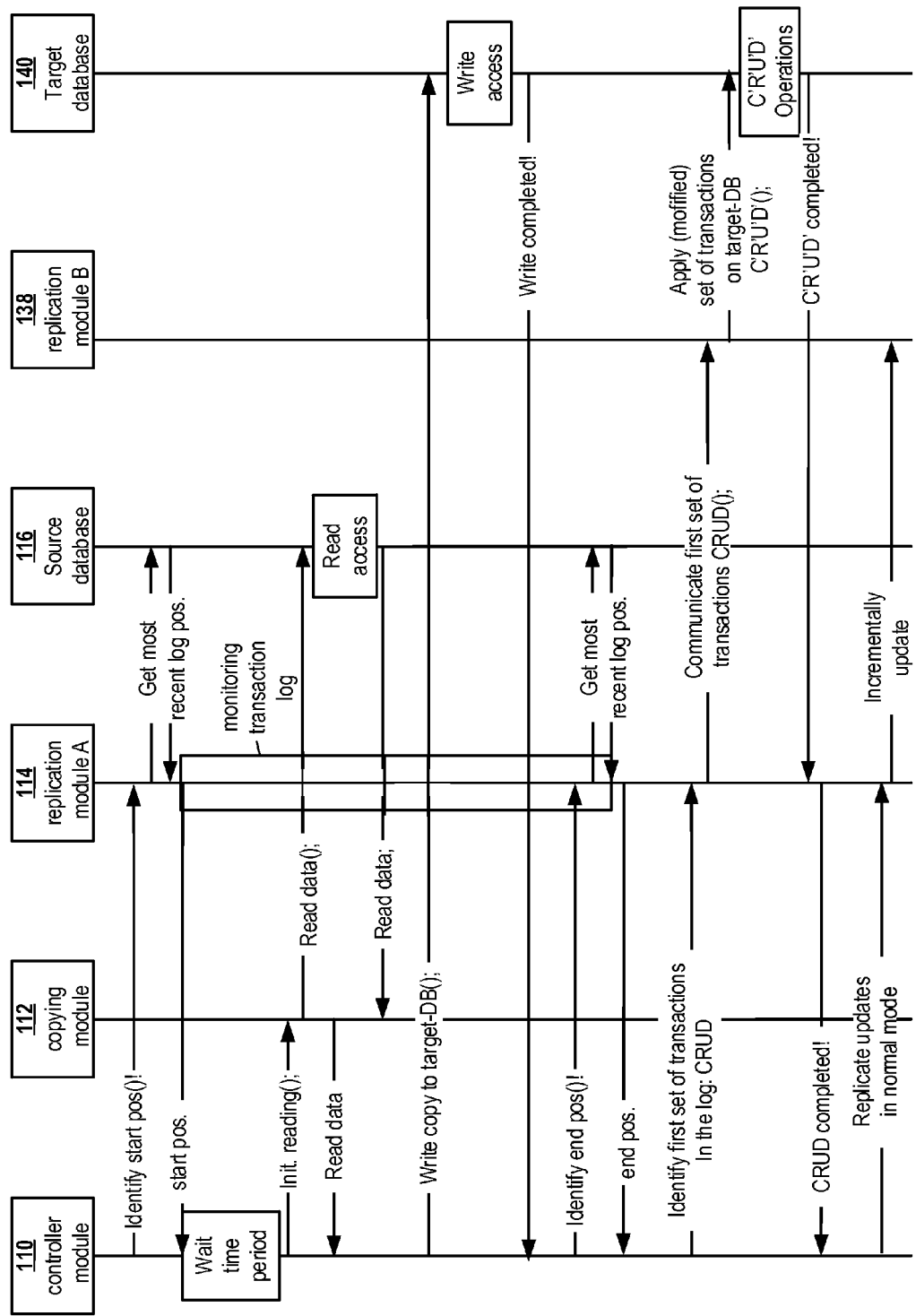
FIG. 5 depicts multiple modules involved in replicating data in accordance with an embodiment.

FIG. 5 depicts multiple modules involved in replicating data 120 according to an embodiment implementing the first alternative replication method. Upon receipt of a replication request, the controller module 110 identifies a first start position SP1 in the log 154 with the help of a source-side replication module 114 and the source database 116. Then, module 110 waits a time period 202 and sends a command to the copying module 112 that initiates the reading process 206 for creating the copy 144. Meanwhile, all transactions executed in parallel on the source database are logged by the source-side replication module 114. After completion of the reading process, or continuously, the controller module 110 writes the copy 144 to the target database 140. As the created copy 144 may lack some changes applied on the source data during the copying, the controller module in interoperation with the source-side replication module identifies in the log 154 one or more transactions ("the first set of transactions") whose changes might be missed by process 206. Said transactions ("CRUD") are communicated to a target-side replication module 138 running on the database server 130 of the target database 140. The controller module causes the target-side replication module 138 to perform the first set of transactions or a modified set of transactions (C'R'U'D') on the copy 140 or might execute said original or modified transactions itself. After completion of the transactions, the copy is consistent with the original database and may be updated incrementally on a regular basis synchronously or asynchronously.

Embodiments provide for an improved replication method and system that allows for concurrent write operations on the source data also during an ongoing replication process.

The problem is solved by the subject matter of the independent claims. Advantageous embodiments are described in the dependent claims. If not explicitly stated otherwise, embodiments can be freely combined with each other.

The term 'source data' as used herein relates to data to be copied (i.e., replicated). The source data may consist of one or more tables of a relational database.

'Replication' or 'copying' is the process of reading some data, e.g., one or more tables or parts of said tables, e.g., individual columns, from a data source to create a copy of the read data, e.g., in the main memory. Said copy may then be transferred to a target, e.g., another computer system or another storage medium and may be written to the target.

A 'relational source database' is a relational database comprising the source data. A 'relational target database' is a relational database used for receiving and storing a copy of the source data.

A relational database may be, for example, a conventional relational database storing database records in individual lines, e.g., MySQL, PostgreSQL or DB2, or a columnar database. A columnar database can also be used as columnar databases are also based on tables with rows. Only the internal storage layout differs.

A 'transaction log' is an application, queue, file, database table or any other kind of persistently or temporarily stored data that holds information about transactions which are currently performed or which have previously been performed (successfully or unsuccessfully) on a database. Thus, a transaction log comprises the changes of the data of a particular database over time. Each transaction may consist of one or more operations and the transaction log may describe all changes imposed by any one of said operations. An operation may be, for example, an individual SQL statement.

A 'database management system' (DBMS) is software that maintains and manages access to data in a database. A database system is a combination of a database and a database management system.

The term 'asynchronously' copying as used herein means that any write operation (which may be specified e.g., in an INSERT, UPDATE or DELETE statement within a transaction) on the source database is considered complete as soon as the source DBMS acknowledges it. It is not necessary to wait with starting the copying until the target database acknowledges the receipt of the data of the write operation. Thus, in asynchronous replication mode, the replication of transactional changes imposed by a transaction comprising a write operation is not performed within the same transaction that caused the changes to the source database. Rather, there is a gap between the changes imposed on the source database and on the target database. This means that any changes made to the data set are scanned periodically and asynchronously propagated to the copies. The replication is not performed within the same transaction that initiated the changes. Consequently, there is a gap between the changes in the replication source and the copies.

The term 'repair process' as used herein is a process of modifying a copy of some source data in a way that all changes imposed on the source data during the copying process which are not contained in said copy are also applied on said copy, thereby 'repairing' said copy by bringing the copy into consistency with the original data.

A 'log position' is a unique position in a transaction log of a database. For example, a log position may be a relative byte address (RBA) or a log record sequence number (LRSN) for DB2 for z/OS. It is a kind of 'logical clock'. Each log position corresponds to a particular point in time when a log entry for said log position is created or at least could have been created by a respective DBMS.

In the following three alternative computer implemented data replication methods will be described which follow the same inventive idea of allowing transactions to execute on the source database while in parallel data of the source database is read for creating a copy to be stored in a target database. Said copying process might miss some changes applied by some of said transactions and might thus not be consistent. However, after having stored the copy in the target database, the transaction log is traversed to identify some transactions or modifications of individual data values which might have been missed, and to selectively apply said missed transactions or data values on the copy stored in the target database to create a consistent copy. Thus, said three alternatives slightly vary in respect to their implementation, but are united by a common idea.

A 'transaction' is a unit of work performed within a DBMS against a database, and treated in a coherent and reliable way independent of other transactions. Transactions in a database environment allow correct recovery from failures and keep a database consistent even in cases of system failure. A database transaction is atomic, consistent, isolated and durable ("ACID").

In one aspect, the embodiments relate to a first alternative of a computer-implemented method for replicating a relational source database. The source database is associated with a transaction log of the source database. For example, the database management system (DBMS) of the source database and/or an external tool may create the transaction log of the source database. The transaction log comprises a list of all transactions previously and/or currently being performed on the source database in chronological order.

The first alternative method comprises: receiving a request for replicating data of the source database to a relational target database; in response to receiving the request, identifying a first start position within the transaction log, the first start position being indicative of the most recent log position in said transaction log; upon having identified the first start position, waiting at least a time period for ensuring that each one of the transactions currently executed on the source database at the moment of receiving said request has terminated at the end of said time period; after having waited said time period, asynchronously creating a copy of data of the source database by selectively reading unmodified data and/or data having been stored to the source database by committed transactions, the reading selectively excluding any changes to be imposed on or having already been imposed on data values of the source database by transactions which are not committed at a moment when said one or more data values are read for creating the copy; 'unmodified data' may be data that may have been stored to the source database e.g., by a mirroring process or any other process resulting in the initiation of data in a database without executing a database transaction; writing the created copy to the target database; after completion of the writing, identifying a repair start position within the transaction log, the repair start position representing the moment of starting a repair process; and starting the repair process;

The repair process comprises: identifying within the transaction log a first set of transactions comprising all transactions which started after the first start position (SP1) and which committed before the repair start position (RSLP); and traversing the transaction log for executing on the copy written in the target database the transactions contained in the identified first set of transactions.

In a further aspect, the embodiments relate to a second alternative computer-implemented method for replicating a relational source database. The source database is associated with a transaction log of the source database. The transaction log comprises a list of all transactions previously and/or currently being performed on the source database in chronological order. The second alternative method comprises: receiving a request for replicating data of the source database to a relational target database; in response to receiving the request, identifying a first start position within the transaction log, the first start position being indicative of the most recent log position in said transaction log; immediately and asynchronously creating a copy of data of the source database by selectively reading unmodified data and/or data having been stored to the source database by committed transactions, the reading selectively excluding any changes to be imposed on or having already been imposed on data values of the source database by transactions which are not committed at a moment when said one or more data values are read for creating the copy; writing the created copy to the target database; after completion of the writing, identifying a repair start position within the transaction log, the repair start position representing the moment of starting a repair process; and starting the repair process.

The repair process comprises: identifying in the transaction log a current set of transactions, the current set of transaction consisting of all transactions having been currently executed at the moment of identifying the first start position; identifying the earliest starting one of said current set of transactions; identifying a second start position in the transaction log, the second start position being a position whose log entry was created at the moment of starting said identified earliest starting transaction; identifying within the transaction log a first set of transactions comprising all transactions which started at or after the second start position and which committed before the repair start position; and traversing the transaction log for executing on the copy written in the target database the transactions contained in the identified first set of transactions.

In a further aspect, the embodiments relate to a third alternative computer-implemented method for replicating a relational source database. The source database is associated with a transaction log of the source database. Each transaction consisting of one or more operations, e.g., transactions. The transaction log comprises a list of all transactions previously and/or currently being performed on the source database in chronological order. The third alternative method comprises: receiving a request for replicating data of the source database to a relational target database; in response to receiving the request, identifying a first start position within the transaction log, the first start position being indicative of the most recent log position in said transaction log; immediately after the receiving of the request asynchronously creating a copy of data of the source database by selectively reading unmodified data and/or data having been stored to the source database by committed transactions, the reading selectively excluding any changes to be imposed on or having already been imposed on data values of the source database by transactions which are not committed at a moment when said one or more data values are read for creating the copy; writing the created copy to the target database; after completion of the writing, identifying a repair start position within the transaction log, the repair start position representing the moment of starting a repair process.

The repair process comprises: identifying in the transaction log a current set of transactions, the current set of transaction consisting of all transactions having been currently executed at the moment of identifying the first start position; identifying a first and a second set of operations, the first set of operations consisting of all operations of transactions in said current set of transactions having been performed on the source database before the moment of starting the reading of the data, the second set of operations consisting of all operations of transactions in said current set of transactions having been performed on the source database at or after the moment of starting the reading of the data; identifying within the transaction log a first set of transactions comprising all transactions which started at or after the first start position and which committed before the repair start position; and traversing the transaction log for selectively executing on the copy written in the target database all operations of the transactions contained in the first set of transactions and all operations of the second set of operations, thereby excluding all operations of the first set of operations.

According to each of said 3 alternative methods, the source database management system is configured such that data in the source database is allowed to change right before a reading operation of an individual data value for creating the copy is executed and right after said individual data value was read.

In a further aspect, the embodiments relate to a computer-readable medium comprising machine executable instructions for execution by one or more processors. Execution of the instructions causes the one or more processors to execute the any one of the above described three alternative computer-implemented methods.

In a further aspect, the embodiments relate to a computer system operationally coupled to a relational source database and to a relational target database. The operational coupling may be based on said computer system comprising a storage medium hosting the source database or may be based on said computer system being connected to said storage medium via a network connection. The source database is associated with a transaction log of the source database. The transaction log comprises a list of all transactions previously and/or currently being performed on the source database in chronological order. The computer system comprises a processor and a non-transitory storage medium hosting a controller module.

The controller module is operable to execute any one of the above described three alternative computer-implemented methods.

In a further aspect, the embodiments relate to a distributed computer system comprising the above mentioned computer system whose storage medium hosts the controller module. Said computer system with the controller module may in addition comprise the source database or may be connected to a different computer system hosting the source database over a network. The distributed computer system further comprises one or more target computer systems. Each of the target computer systems hosts an instance of the target database, wherein each of the target computer systems is coupled to the computer system hosting the controller module via a network.

An embodiment may also relate to a computer-implemented method for replicating a relational source database, the source database being associated with a transaction log of the source database, the transaction log comprising a list of all transactions previously or currently being performed on the source database in chronological order, the computer-implemented method comprising: receiving a request for replicating data of the source database to a relational target database; in response to receiving the request for replicating data of the source database, identifying a first start position within the transaction log, the first start position being indicative of the most recent log position in said transaction log; immediately after the receiving of the request, asynchronously creating a copy of data of the source database by selectively reading unmodified data or data having been stored to the source database by committed transactions, wherein the selectively reading excludes any changes to be imposed on or having already been imposed on data values of the source database by transactions which are not committed at a moment when said one or more data values are read for creating the copy; writing the created copy to the relational target database; after completion of the writing of the created copy to the relational target database, identifying a repair start position within the transaction log, the repair start position representing a moment of starting a repair operation; and starting the repair operation, the repair operation comprising: identifying in the transaction log a current set of transactions, the current set of transaction comprising all transactions having been currently executed at a moment of identifying the first start position, identifying an earliest starting one of said current set of transactions, identifying a second start position in the transaction log, the second start position being a position whose log entry was created at a moment of starting said identified earliest starting transaction, identifying within the transaction log a first set of transactions comprising all transactions that started at or after the second start position and that committed before the repair start position, and traversing the transaction log for executing on the copy written in the target database the transactions contained in the first set of transactions.

Another embodiment may also relate to a computer-implemented method for replicating a relational source database, the source database being associated with a transaction log of the source database, the transaction log comprising a list of all transactions previously or currently being performed on the source database in chronological order, the computer-implemented method comprising: receiving a request for replicating data of the source database to a relational target database; in response to receiving the request for replicating data of the source database, identifying a first start position within the transaction log, the first start position being indicative of the most recent log position in said transaction log; immediately after the receiving of the request, asynchronously creating a copy of data of the source database by selectively reading unmodified data or data having been stored to the source database by committed transactions, wherein the selectively reading excludes any changes to be imposed on or having already been imposed on data values of the source database by transactions which are not committed at a moment when said one or more data values are read for creating the copy; writing the created copy to the relational target database; after completion of the writing of the created copy to the relational target database, identifying a repair start position within the transaction log, the repair start position representing a moment of starting a repair operation; and starting the repair operation, the repair operation comprising: identifying in the transaction log a current set of transactions, the current set of transaction comprising all transactions having been currently executed at a moment of identifying the first start position, identifying a first and a second set of operations, the first set of operations consisting of all operations of transactions in said current set of transactions having been performed on the source database before a moment of starting the reading of the data, the second set of operations consisting of all operations of transactions in said current set of transactions having been performed on the source database at or after the moment of starting the reading of the data, identifying within the transaction log a first set of transactions comprising all transactions which started at or after the first start position and which committed before the repair start position, and traversing the transaction log for selectively executing on the copy written in the target database all operations of the transactions contained in the first set of transactions and all operations of the second set of operations to exclude all operations of the first set of operations.

Another embodiment may also relate to a computer system operationally coupled to a relational source database and to a relational target database. The computer system comprising a processor and a non-transitory storage medium comprising a controller module configured to execute a computer implemented method for replicating a relational source database. The computer-implemented method comprises associating the relational source database with a transaction log, the transaction log comprising a list of all transactions previously or currently being performed on the relational source database in chronological order, receiving a request for replicating data of the relational source database to a relational target database; in response to receiving the request for replicating data of the relational source database, identifying a first start position within the transaction log, the first start position being indicative of a most recent log position in said transaction log; upon having identified the first start position, waiting at least a time period for ensuring that each transaction currently executing on the relational source database at a moment of receiving said request for replicating data of the relational source database has terminated at an end of said time period; after having waited said time period, asynchronously creating a copy of data of the relational source database to produce a created copy by selectively reading at least one of unmodified data and data having been stored to the relational source database by committed transactions, wherein the selectively reading excludes any changes to be imposed on or having already been imposed on data values by transactions that are not committed at a moment when said one or more data values are read for creating the copy; writing the created copy to the relational target database; and in response to completing the writing of the created copy to the relational target database, identifying a repair start position within the transaction log, the repair start position representing a moment of starting a repair operation, the repair operation comprising: identifying within the transaction log a first set of transactions comprising all transactions that started after the first start position and that committed before the repair start position, and traversing the transaction log to execute on the created copy written in the relational target database the first set of transactions.

Another embodiment may also relate distributed computer architecture, comprising a computer system operationally coupled to a relational source database and to a relational target database. The computer system comprising a processor and a non-transitory storage medium comprising a controller module configured to execute a computer implemented method for replicating a relational source database. The computer-implemented method comprises associating the relational source database with a transaction log, the transaction log comprising a list of all transactions previously or currently being performed on the relational source database in chronological order, receiving a request for replicating data of the relational source database to a relational target database; in response to receiving the request for replicating data of the relational source database, identifying a first start position within the transaction log, the first start position being indicative of a most recent log position in said transaction log; upon having identified the first start position, waiting at least a time period for ensuring that each transaction currently executing on the relational source database at a moment of receiving said request for replicating data of the relational source database has terminated at an end of said time period; after having waited said time period, asynchronously creating a copy of data of the relational source database to produce a created copy by selectively reading at least one of unmodified data and data having been stored to the relational source database by committed transactions, wherein the selectively reading excludes any changes to be imposed on or having already been imposed on data values by transactions that are not committed at a moment when said one or more data values are read for creating the copy; writing the created copy to the relational target database; and in response to completing the writing of the created copy to the relational target database, identifying a repair start position within the transaction log, the repair start position representing a moment of starting a repair operation, the repair operation comprising: identifying within the transaction log a first set of transactions comprising all transactions that started after the first start position and that committed before the repair start position, and traversing the transaction log to execute on the created copy written in the relational target database the first set of transactions. The distributed computer architecture further includes one or more target computer systems, each of the target computer systems hosting an instance of the relational target database. Each of the target computer systems is further coupled to the computer system hosting the controller module via a network.

What is claimed is:

1. A computer-implemented method for replicating a relational source database, the computer-implemented method comprising:

associating the relational source database with a transaction log, the transaction log comprising a list of all transactions previously or currently being performed on the relational source database in chronological order, receiving a request for replicating data of the relational source database to a relational target database;

in response to receiving the request for replicating data of the relational source database, identifying a first start position within the transaction log, the first start position being indicative of a most recent log position in said transaction log;

identifying a time period by one of:

analyzing the transaction log to identify a previously executed transaction having a maximum execution time of all previously executed transactions listed in the transaction log, and using said maximum execution time as the time period, or using the moment in time of identifying the first start position as first time point, identifying all currently executed transactions at the first time point, identifying a moment in time as a second time point when the one of said currently executed transactions having the longest execution time commits, and using the time period between said first and second time points;

upon having identified the first start position, waiting at least the time period for ensuring that each transaction currently executing on the relational source database at a moment of receiving said request for replicating data of the relational source database has terminated at an end of the time period;

after having waited the time period, asynchronously creating a copy of data of the relational source database to produce a created copy by selectively reading at least one of unmodified data and data having been stored to the relational source database by committed transactions, wherein the selectively reading excludes any changes to be imposed on or having already been imposed on data values by transactions that are not committed at a moment when said one or more data values are read for creating the copy, wherein the relational source database is configured to impose locks on individual data values being currently read for creating the copy by reading of the data on concurrently executed transactions of the relational source database, whereby all other data values contained in a same row as the currently read individual data values allow read operations and write operations by the concurrent transactions;

writing the created copy to the relational target database; and in response to completing the writing of the created copy to the relational target database, identifying a repair start position within the transaction log, the repair start position representing a moment of starting a repair operation, the repair operation comprising:

identifying in the transaction log a current set of transactions, the current set of transaction comprising all transactions having been currently executed at a moment of identifying the first start position, identifying a first and a second set of operations, the first set of operations consisting of all operations of transactions in said current set of transactions having been performed on the relational source database before a moment of starting the reading of the data, the second set of operations consisting of all operations of transactions in said current set of transactions having been performed on the relational source database at or after the moment of starting the reading of the data, identifying within the transaction log a first set of transactions comprising all transactions which started at or after the first start position and which committed before the repair start position, and traversing the transaction log for selectively executing on the copy written in the relational target database all operations of the transactions contained in the first set of transactions and all operations of the second set of operations to exclude all operations of the first set of operations.

2. The computer implemented method of claim 1, wherein said maximum execution time is used as the time period, and the method further comprises:

determining that at least one transaction having been currently executed in the moment of identifying the first start position has not committed at the end of the time period; and outputting a warning message or automatically re-executing of the computer implemented method following the receiving of the request to use a current time as the time of receiving the request.

3. The computer implemented method of claim 1, wherein each transaction comprises of one or more operations, wherein the executing of the identified first set of transactions and the executing of the second set of operations comprises:

checking, for each of the operations of said first set of transactions or for each operation of said second set of operations, if changes to be imposed on one or more data values by said operation had already been performed on said data values in the relational source database before the copy was created; and selectively executing said operations only in case said changes had not been performed already.

4. The computer implemented method of claim 3, the transaction log comprising, for any UPDATE, INSERT and DELETE operation, one or more original data values to be overwritten by said operation and one or more respective new data values to overwrite the original data values, the checking if the changes had already been performed comprising comparing the original data values or the new data values with corresponding data values of the copy in the relational target database for determining if a respective operation had already been performed in the relational source database before said data values were read for creating the copy.

5. The computer implemented method of claim 1, wherein the transaction log comprises checkpoints,
   wherein each checkpoint is a point automatically and regularly specified and written into the transaction log and from which an SQL based database engine is able to start applying changes contained in the transaction log during recovery after an unexpected shutdown or crash, and
   wherein determining the first start position comprises using a most recent checkpoint in said transaction log at the moment of the starting of the creating the copy as the first starting position.

6. The computer implemented method of claim 1, said method being performed by a controller module, the reading of the data by the controller module for creating the copy comprising:
   the controller module sending a first command to a copying module for initiating the reading of the data;
   in response to said first command, the copying module:
   configuring the relational source database,
   reading data from the relational source database, and
   forwarding the data from the relational source database to the controller module,
   wherein the controller module creates the copy of the data from the forwarded data.

7. The computer implemented method of claim 6, wherein the relational source database and the controller module are operated on a first processing device and the relational target database is operated on a second processing device, the first and second processing devices being connected to each other via a network.

8. A non-transitory computer-readable medium comprising machine executable instructions for execution by one or more processors, wherein execution of the instructions causes the one or more processors to execute a computer implemented method for replicating a relational source database, the computer-implemented method comprising:
   associating the relational source database with a transaction log, the transaction log comprising a list of all transactions previously or currently being performed on the relational source database in chronological order,
   receiving a request for replicating data of the relational source database to a relational target database;
   in response to receiving the request for replicating data of the relational source database, identifying a first start position within the transaction log, the first start position being indicative of a most recent log position in said transaction log,
   identifying a time period by one of:
      analyzing the transaction log to identify a previously executed transaction having a maximum execution time of all previously executed transactions listed in the transaction log, and using said maximum execution time as the time period, or
      using the moment in time of identifying the first start position as first time point, identifying all currently executed transactions at the first time point, identifying a moment in time as a second time point when the one of said currently executed transactions having the longest execution time commits, and using the time period between said first and second time points;
   upon having identified the first start position, waiting at least the time period for ensuring that each transaction currently executing on the relational source database at a moment of receiving said request for replicating data of the relational source database has terminated at an end of the time period;
   after having waited the time period, asynchronously creating a copy of data of the relational source database to produce a created copy by selectively reading at least one of unmodified data and data having been stored to the relational source database by committed transactions, wherein the selectively reading excludes any changes to be imposed on or having already been imposed on data values by transactions that are not committed at a moment when said one or more data values are read for creating the copy,
   wherein the relational source database is configured to impose locks on individual data values being currently read for creating the copy by reading of the data on concurrently executed transactions of the relational source database, whereby all other data values contained in a same row as the currently read individual data values allow read operations and write operations by the concurrent transactions;
   writing the created copy to the relational target database; and
   in response to completing the writing of the created copy to the relational target database, identifying a repair start position within the transaction log, the repair start position representing a moment of starting a repair operation, the repair operation comprising:
      identifying in the transaction log a current set of transactions, the current set of transaction comprising all transactions having been currently executed at a moment of identifying the first start position,
      identifying a first and a second set of operations, the first set of operations consisting of all operations of transactions in said current set of transactions having been performed on the relational source database before a moment of starting the reading of the data, the second set of operations consisting of all operations of transactions in said current set of transactions having been performed on the relational source database at or after the moment of starting the reading of the data,
      identifying within the transaction log a first set of transactions comprising all transactions which started at or after the first start position and which committed before the repair start position, and
      traversing the transaction log for selectively executing on the copy written in the relational target database all operations of the transactions contained in the first set of transactions and all operations of the second set of operations to exclude all operations of the first set of operations.

9. A computer-implemented method for replicating a relational source database, the relational source database being associated with a transaction log of the relational source database, the transaction log comprising a list of all transactions previously or currently being performed on the relational source database in chronological order, the computer-implemented method comprising:
   receiving a request for replicating data of the relational source database to a relational target database;

in response to receiving the request for replicating data of the relational source database, identifying a first start position within the transaction log, the first start position being indicative of the most recent log position in said transaction log, identifying a time period by one of:
- analyzing the transaction log to identify a previously executed transaction having a maximum execution time of all previously executed transactions listed in the transaction log, and using said maximum execution time as the time period, or
- using the moment in time of identifying the first start position as first time point, identifying all currently executed transactions at the first time point, identifying a moment in time as a second time point when the one of said currently executed transactions having the longest execution time commits, and using the time period between said first and second time points;

immediately after the receiving of the request, asynchronously creating a copy of data of the relational source database by selectively reading unmodified data or data having been stored to the relational source database by committed transactions, wherein the selectively reading excludes any changes to be imposed on or having already been imposed on data values of the relational source database by transactions which are not committed at a moment when said one or more data values are read for creating the copy, wherein the relational source database is configured to impose locks on individual data values being currently read for creating the copy by reading of the data on concurrently executed transactions of the relational source database, whereby all other data values contained in a same row as the currently read individual data values allow read operations and write operations by the concurrent transactions;

writing the created copy to the relational target database;

after completion of the writing of the created copy to the relational target database, identifying a repair start position within the transaction log, the repair start position representing a moment of starting a repair operation; and starting the repair operation comprising:
- identifying in the transaction log a current set of transactions, the current set of transaction comprising all transactions having been currently executed at a moment of identifying the first start position,
- identifying a first and a second set of operations, the first set of operations consisting of all operations of transactions in said current set of transactions having been performed on the relational source database before a moment of starting the reading of the data, the second set of operations consisting of all operations of transactions in said current set of transactions having been performed on the relational source database at or after the moment of starting the reading of the data,
- identifying within the transaction log a first set of transactions comprising all transactions which started at or after the first start position and which committed before the repair start position, and
- traversing the transaction log for selectively executing on the copy written in the relational target database all operations of the transactions contained in the first set of transactions and all operations of the second set of operations to exclude all operations of the first set of operations.

\* \* \* \* \*